(12) United States Patent  (10) Patent No.: US 6,543,229 B2
Johansson  (45) Date of Patent: Apr. 8, 2003

(54) EXHAUST GAS ALTERNATOR SYSTEM

(75) Inventor: Lennart Johansson, Ann Arbor, MI (US)

(73) Assignee: STM Power, Inc., Ann Arbor, MI (US)

( * ) Notice: Subject to any disclaimer, the term of this patent is extended or adjusted under 35 U.S.C. 154(b) by 0 days.

(21) Appl. No.: 09/881,112

(22) Filed: Jun. 14, 2001

(65) Prior Publication Data

US 2002/0017098 A1 Feb. 14, 2002

Related U.S. Application Data

(60) Provisional application No. 60/211,689, filed on Jun. 14, 2000.

(51) Int. Cl.[7] .................................................. F02B 33/44

(52) U.S. Cl. ........................................ 60/605.1; 60/517

(58) Field of Search .......................... 60/616, 620, 517, 60/525

(56) References Cited

U.S. PATENT DOCUMENTS

| | | | | | |
|---|---|---|---|---|---|
| 4,070,860 A | * | 1/1978 | Hanson | ........................ | 60/616 |
| 4,380,152 A | * | 4/1983 | Folsom et al. | ................. | 60/520 |
| 4,715,183 A | | 12/1987 | Meijer et al. | | |
| 5,884,481 A | | 3/1999 | Johansson et al. | | |
| 6,062,023 A | * | 5/2000 | Kerwin et al. | ................. | 60/520 |
| 6,122,909 A | * | 9/2000 | Murphy et al. | ................ | 60/286 |

* cited by examiner

*Primary Examiner*—Hoang Nguyen
(74) *Attorney, Agent, or Firm*—Brinks Hofer Gilson & Lione

(57) ABSTRACT

An exhaust gas alternator system for a diesel powered motor vehicle including a Stirling engine operating through a heat input of waste heat from a diesel engine exhaust to drive an electrical alternator. The cooler of the Stirling engine receives liquid engine coolant. An auxiliary diesel fuel burner may be operated to provide heat input for said Stirling engine when the diesel engine is not operated. The system may be used in an exhaust circuit having a catalytic converter.

11 Claims, 1 Drawing Sheet

EXHAUST GAS ALTERNATOR SYSTEM

This application claims the benefit of Provisional Application No. 60/211,689, filed Jun. 14, 2000.

FIELD OF THE INVENTION

This invention is related to a system for providing auxiliary electrical power for a motor vehicle such as a heavy-duty truck. Specifically, the system provides energy by converting thermal exhaust gas energy to electrical power.

BACKGROUND OF THE INVENTION

Improving the energy efficiency of motor vehicles is of primary importance to vehicle manufacturers and operators. These objectives are particularly important for heavy-duty trucks for which fuel cost is a significant component of overall operating cost and therefore the cost for delivering payloads to remote destinations. Presently, auxiliary electrical loads to operate systems on board a heavy truck including interior and exterior lighting, air conditioning, heating, engine control system, and other accessories. These demands constitute a significant load on the vehicle engine. Shaft horsepower must be taken from the engine and converting to electrical energy, typically through a belt driven alternator to provide an electrical power source for such auxiliary loads. The onboard DC battery provides cranking energy for starting the vehicle engine and further acts as a buffer to accommodate differences between available electrical energy from the alternator and the instantaneous electrical demand. At the same time that power is being taken from the engine to drive the alternator, considerable energy is dispersed to the atmosphere in the form of hot engine exhaust gases. The discharge of heated gases represents a thermal efficiency penalty for the overall motor vehicle system.

SUMMARY OF THE INVENTION

In accordance with this invention, waste thermal energy from a motor vehicle in the form of hot exhaust gases is used to provide a heat source for a Stirling engine which converts heat input energy into mechanical shaft output power, which drives an electrical alternator. If desired, a small combustion furnace can be associated with the Stirling engine to provide electrical output from the alternator in conditions such as start up where sufficient heat energy is not available from the engine exhaust gases to power the Stirling engine.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
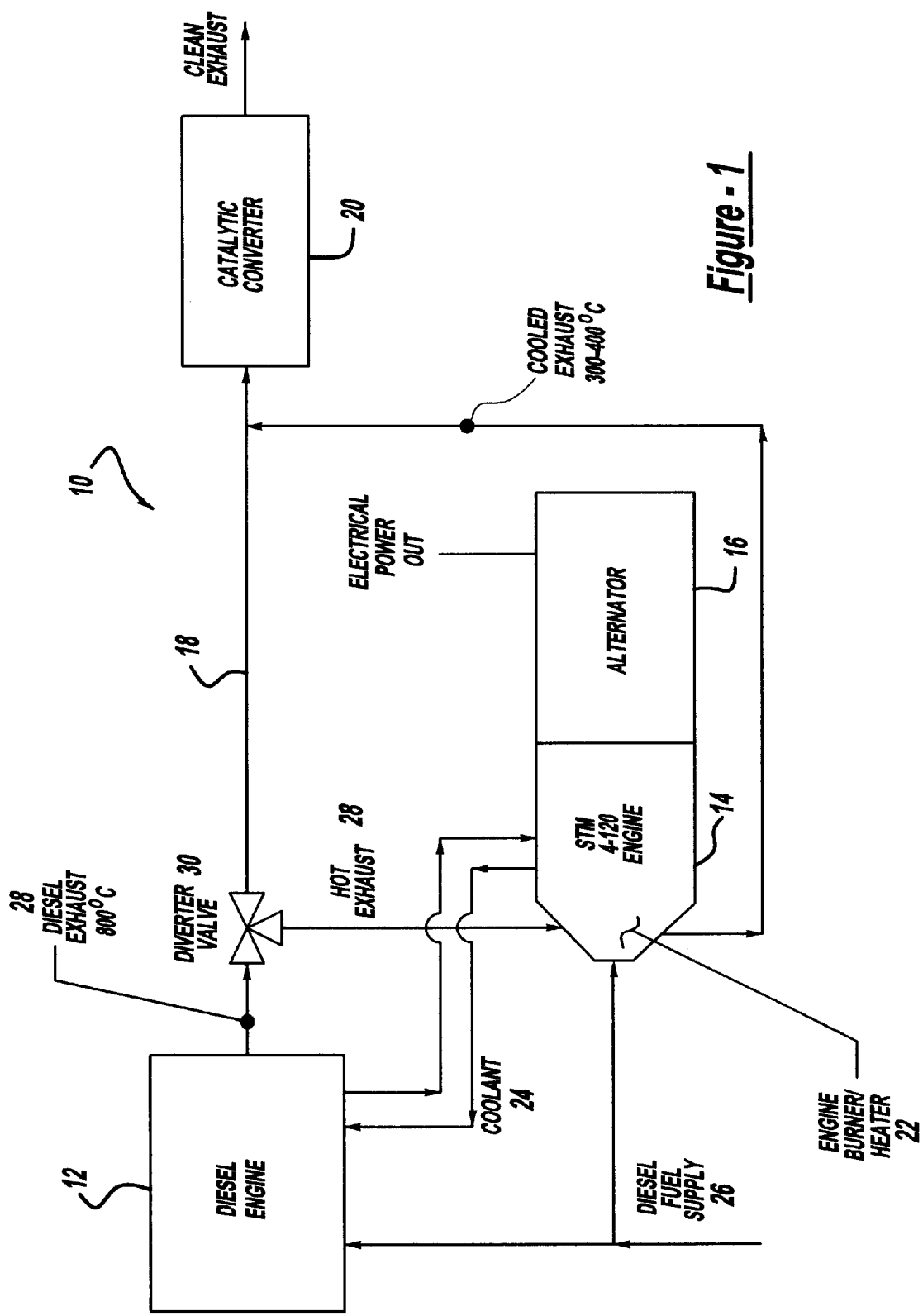
FIG. 1 provides a diagrammatic illustration of the exhaust alternator system in accordance with this invention.

The exhaust gas alternator system in accordance with this invention is shown in FIG. 1 and is generally designated by reference number 10. With reference to FIG. 1, the diesel engine 12 shown could be any internal combustion engine which creates heated exhaust gases. Although this invention is described in connection with heavy-duty diesel engine powered vehicle, other heat sources could be employed, provided that they produce elevated temperature hot exhaust gases.

The figure further illustrates a "STM 4-120" Stirling engine 14. This designates an engine manufactured by the applicants which employed a Stirling cycle and includes four double acting piston/displacer assemblies. An additional description of the STM 4-120 Stirling engine 14 is provide with reference to the following U.S. Pat. No. 4,994,004; 4,977,742; 5,074,114; 4,996,841; 5,611,201; 5,864,770; 5,706,659; 5,771,694; 5,836,846; 5,865,091; 5,884,481; 5,938,207 which are hereby incorporated by reference. As an alternative, any energy converter which is capable of providing an electrical or shaft power output from a heat source and produces waste heat could be implemented in accordance with this invention.

The Stirling engine 14 drives an alternator 16 which converts rotary shaft input energy from the engine to an electrical power output as designated in the drawing. Alternator 16 converts rotary shaft input energy to an electrical output. The power output from alternator 16 is connected with the vehicle electrical supply buss. Exhaust gases 28 from the diesel engine 12, shown as being at about 800° C., are routed through a heat exchanger in the heater head/burner 22 of engine 14 and is later re-circulated to the vehicle exhaust system, shown diagrammatically by arrow 18. Thereafter the exhaust gases flow through catalytic converter 20 where certain emission species are reduced as a means of controlling polluting emissions from the vehicle. Since the Stirling engine 14 reacts to a temperature differential, a coolant fluid 24 from diesel engine 12 is employed as a heat sink. A cooler heat exchanger (not shown) of Stirling engine 14 receives engine coolant fluid 24 which is recirculated to the engine and through the engine's radiator heat exchange system (not illustrated). The auxiliary supply of diesel fuel 26 to the Stirling engine 14 may be used to power a small combustion furnace which is part of heater head/burner 22 of Stirling engine 14. Alternatively, the burner could be a separate component for supplying heated gases to the engine heater head. As shown herein, however, the heater head and the burner are combined and designated as heater head/burner 22.

After hot exhaust gases 28 leave diesel engine 12, their direction is controlled by diverter valve 30. In one position of diverter valve 30, exhaust gases 28 follow their normal route, through catalytic converter 20, and are then emitted out of an exhaust stack. In another position of valve 30, the gases are routed through Stirling engine heater head/burner 22. Since thermal energy is removed from the gases 28, its temperature decreases from about 800° C. to about 300–400° C.

The power output from heavy-duty diesel engines 12 is typically between 400–500 horse power (hp). The amount of energy lost in the exhaust gases 28 is about 300–400 hp at full load (assuming about 40% engine thermal efficiency). As indicated in the figure, the exhaust gas temperature from a heavy-duty diesel engine 12 is about 800° C. Therefore, there is sufficient heat to operate the Stirling engine 14 using a portion of this heat. Assuming the Stirling engine 14 operates on a temperature difference of 100–200 ° C., there is a sufficient amount of heat to use from the exhaust gases 28 based on a temperature drop of exhaust gases 28 of 800° C. to 300–400° C.

Assuming an efficiency of 85% for a 10 kW heavy-duty alternator 16, the power requirement into the alternator is about 12 kW, which corresponds to 13.5 hp. An existing STM 4-120 Stirling engine 14 provides over 40 hp at 1800 rpm. This means the engine 14 can be derated without any penalty other than efficiency, since in this application, the source energy is "free" (i.e. waste heat). Assuming the Stirling engine 14 operating in a derated mode has an efficiency of 25%, approximately 44 kW (60 hp) of heat input flow is required at full load. The diesel engine 12 will now have 60 hp of additional power or will consume less in fuel for the same operating conditions, which corresponds to a fuel saving of approximately 12–15% at full power.

Diesel engines 12 have high emissions during start up, especially during cold start up. Also, the exhaust gas temperature from diesel engines is often too high for conventional catalytic converters. Ideally the temperature for the catalytic converter 20 should be between 300–400° C. At 250° C., the converter 20 operates at 50% effectiveness, and at 100% at 325° C., and decreases rapidly above 425° C.

In a start-up mode for system 10, diesel fuel 26 is supplied to heater head/burner 22, where it is combusted to supply heat. Exhaust gases from this auxiliary source of heat may be directed through the exhaust gas circuit and through converter 20. The heater head/burner 22 on the Stirling engine 14 will heat up the catalytic converter 20 to an ideal temperature while the engine coolant is heated from the Stirling engine 14 and the vehicle batteries (not shown) are kept fully charged by the exhaust gas alternator system 10. Once the ideal exhaust gas temperature is reached for catalytic converter 20, the main diesel engine 12 may be started. The burner of heater head/burner 22 can be used to maintain the temperature until the diesel engine 12 reaches full operating temperature.

Typically, the Stirling engine 14 may operate on heat stored in internal components even after the burner of heater head/burner 22 is not operating for several minutes. This thermal storage can be expanded using aluminum oxide or other more advanced materials. Such a thermal battery can be installed between the diesel engine 12 and the catalytic converter 20 and extend the operating time substantially.

By placing Stirling engine 12 and alternator 16 between the diesel engine 12 and the catalytic converter 20, the exhaust gas 28 temperature is decreased, which allows the catalytic converter 20 to operate under more ideal conditions with reduced emissions. During standstill and at nighttime, the system 10 provides "hotel power" (electricity and heat) using the small diesel fuel burner of heater head/burner 22 without operating diesel engine 12. While parked, the main diesel engine 12 can be shut off, which saves fuel, with less pollution in the form of emissions and noise. The heat from the cooling water for the Stirling engine 14 is used to keep the diesel engine 12 warm with resulting less wear and emission at start up.

Therefore, the system 10 provides the following benefits for a motor vehicle: 1) provides auxiliary electrical power, 2) maintains engine coolant at an ideal temperature and provides cabin heat without operating the main engine, 3) maintains a catalytic converter at an efficient operating temperature before start-up, 4) reduces main engine exhaust gas temperature for more efficient catalytic converter operation, and 5) improves overall vehicle operating efficiency.

While the above description constitutes the preferred embodiment of the present invention, it will be appreciated that the invention is susceptible to modification, variation and change without departing from the proper scope and fair meaning of the accompanying claims.

What is claimed is:

1. An exhaust gas alternator system for using exhaust gases from a motor vehicle internal combustion engine to produce electrical energy comprising:
    a Stirling cycle heat engine having a heater head heated by said exhaust gases and a cooler receiving a liquid engine coolant fluid from said internal combustion engine;
    an alternator connected with said Stirling engine to produce said electrical energy, and;
    a burner for receiving a combustible fuel for heating said heater head when heat from said exhaust gases is not sufficient to produce said electrical energy.

2. An exhaust gas alternator in accordance with claim 1 further comprising a catalytic converter for receiving said exhaust gases and reducing emissions of said exhaust gases.

3. An exhaust gas alternator in accordance with claim 2 further comprising a diverter valve for controlling the flow of said exhaust gases directly to said catalytic converter in a first position, and through said heater head in a second position.

4. An exhaust gas alternator in accordance with claim 1 wherein said system is operable such that said burner may be operated to produce heated gases for said heater head while said internal combustion engine is not operating to thereby enable said Stirling cycle heat engine to power said alternator.

5. An exhaust gas alternator system for using exhaust gases from an internal combustion engine of a motor vehicle to produce electrical energy for said motor vehicle, comprising:
    a Stirling cycle heat engine having a heater head for receiving said exhaust gases and providing an energy input for said Stirling cycle heat engine, and a cooler receiving a coolant fluid from said internal combustion engine, and a burner for receiving a combustible fuel for providing heat input for said heater head;
    an alternator connected with said Stirling engine to produce said electrical energy; and
    a diverter valve for controlling the flow of said exhaust gases from a first position bypassing said heater head, and a second position through said heater head.

6. An exhaust gas alternator in accordance with claim 6 wherein said internal combustion engine is a diesel engine.

7. An exhaust gas alternator in accordance with claim 6 further comprising a catalytic converter for receiving said exhaust gases and reducing emissions of said exhaust gases.

8. An exhaust gas alternator in accordance with cliam 7 wherein said system is operable such that said burner may be operated to produce geated gases for said heater head while said internal combustion engine is not operating ot thereby enable said Stiriling cycle heat engine to power said alternator.

9. An exhaust gas alternator system for a diesel enginge powered motor vehicle, comprising:
    a Stirling cycle heat engine having a heater haed/burner for receiving a flow of heated exhaust gases from said diesel engine for providing a primary heat input to operate said diesel engine, said geater head/burner further receiveing a flow of diesel engine fuel and combusting said fuel to produce an auxlary heat input which supplements or replaces said primary heat input, said Stirling cycle heat engine further having a cooler which receives and recirculates back to said diesel engine a flow of liquid engine coolant;
    an alternator mechanically couple with said Stirling cycle heat engine for generating electrical energy from a mechanical input from said Stirling cycle engine; and
    a diverter valve for controling the flow of said exhaust gases bypassing said heater head/burner in a first position. and through said heater head/burner in a second position, wherby said system being opperable in a first mode in which said diesel engine isn not operating and said heater head/burner is opperated to supply heat to said Stirling engine by combusting said fuel to power said alternator and said cooler acts to heat said liquor engine coolant, and said system being operable in a second mode in which said diverter valve is in said second position and said diesel engine is operated to produce said exhaust gases which provided a heat input for said Stirling cycle heat engine.

10. An exhaust gas alternator in accordance with claim 9, further comprising a catalytic converter for recieving said exhaust gases and reducing emissions of said exhaust gases.

11. An exhaust gas alternator system for using exhaust gases from a motor vehicle internal combustion engine to produce electrical energy comprising:

a Stirling cycle heat engine having a heater head heated by said exhaust gases and a cooler receiving a liquid engine coolant fluid from said internal combustion engine;

an alternator connected with said Stirling engine to produce said electrical energy;

a burner for receiving a combustible fuel for heating said heater head when heat from said exhaust gases is not sufficient to produce said electrical energy;

a catalytic converter for receiving said exhaust gases and reducing emissions of said exhaust gases; and a diverter valve for controlling the flow of said exhaust gases directly to said catalytic converter in a first position, and through said heater head in a second position.

* * * * *

UNITED STATES PATENT AND TRADEMARK OFFICE
CERTIFICATE OF CORRECTION

PATENT NO.    : 6,543,229 B2
DATED         : April 8, 2003
INVENTOR(S)   : Lennart Johansson It is certified that error appears in the above-identified patent and that said Letters Patent is hereby corrected as shown below:

Column 4,
Lines 38 and 40, delete "claim 6" and insert -- claim 5 --.
Line 43, delete "claim 7" and insert -- claim 6 --.
Line 46, after "operating", delete "ot" and insert -- to --.
Line 55, after "said", delete "geater" and insert -- heater --.

Column 5,
Line 3, after "engine", delete "isn" and insert -- is --.
Line 10, after "which", delete "provided" and insert -- provide --.

Signed and Sealed this

Seventh Day of October, 2003

JAMES E. ROGAN
*Director of the United States Patent and Trademark Office*